Figure 1:
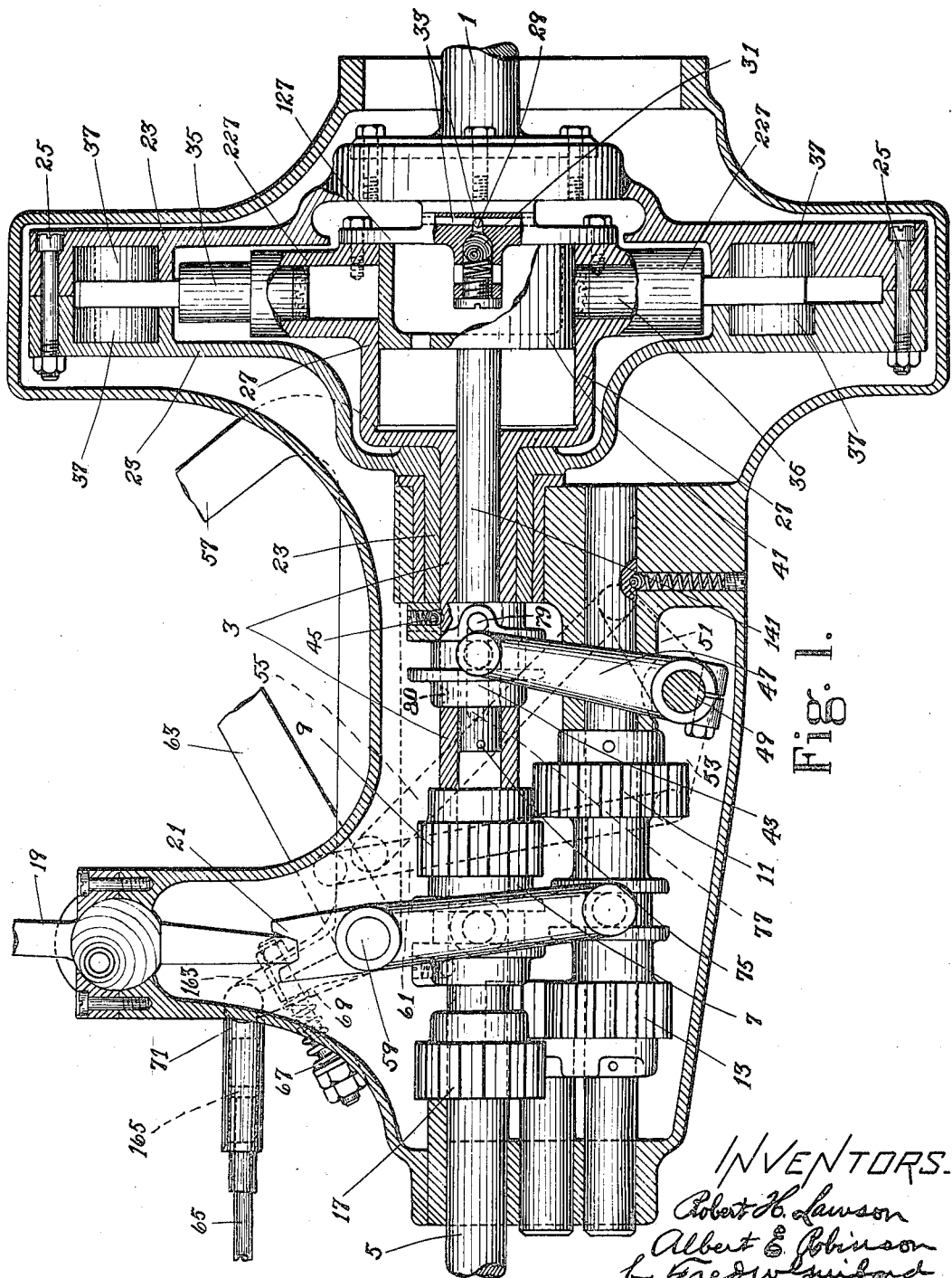

R. H. LAWSON & A. E. ROBINSON.
VARIABLE SPEED TRANSMISSION MECHANISM.
APPLICATION FILED MAR. 4, 1916.

1,232,571.

Patented July 10, 1917.
2 SHEETS—SHEET 2.

UNITED STATES PATENT OFFICE.

ROBERT H. LAWSON AND ALBERT E. ROBINSON, OF BEVERLY, MASSACHUSETTS.

VARIABLE-SPEED-TRANSMISSION MECHANISM.

1,232,571.           Specification of Letters Patent.        Patented July 10, 1917.

Application filed March 4, 1916. Serial No. 82,157.

*To all whom it may concern:*

Be it known that we, ROBERT H. LAWSON and ALBERT E. ROBINSON, citizens of the United States, residing at Beverly, in the county of Essex and State of Massachusetts, have invented certain Improvements in Variable-Speed-Transmission Mechanism, of which the following description, in connection with the accompanying drawings, is a specification, like reference characters on the drawings indicating like parts in the several figures.

This invention relates to a variable speed transmission of the fluid-controlled type.

It has been proposed to connect a driving member with a driven member through pistons and cylinders communicating with a reservoir for liquid in such a manner that rotation of the driving member causes reciprocation of the plungers, and to provide means for partially or entirely cutting off said communication and thereby locking the pistons from movement or retarding their motion in their respective cylinders, when desired, in order to impart rotation to said driven member; so far as we are aware none of these proposed constructions has gone into successful commercial use.

There are, among others, three serious difficulties which have been encountered. Certain dead point positions and negative positions are necessarily occupied at times by the pistons; and if these positions preponderate greatly one or more times at each revolution over the positive positions, a jerky and uneven transmission of power will result. By "positive position" we mean a position during the advance of a piston against the liquid, and by "negative position" a position during the retraction of a piston. Again the pressure developed by the action of the pistons when a heavy load is being carried is very great with the result that the oil or other fluid leaks out more or less, thus permitting a certain amount of lost motion by the pistons and thereby causing to be imparted to the driven member an uneven rotation. As has been stated above, the pressure developed is great; and a further difficulty due to this pressure is that the valve or valves which open and close communication between the reservoir and cylinders are difficult to operate.

The general object of the present invention is to produce a fluid-controlled transmission mechanism in which these disadvantages shall be obviated.

These and other features of the invention, including certain details of construction and combinations of parts, will be described in connection with an illustrative mechanism and pointed out in the appended claims.

Referring now to the accompanying drawings,—

Figure 2:
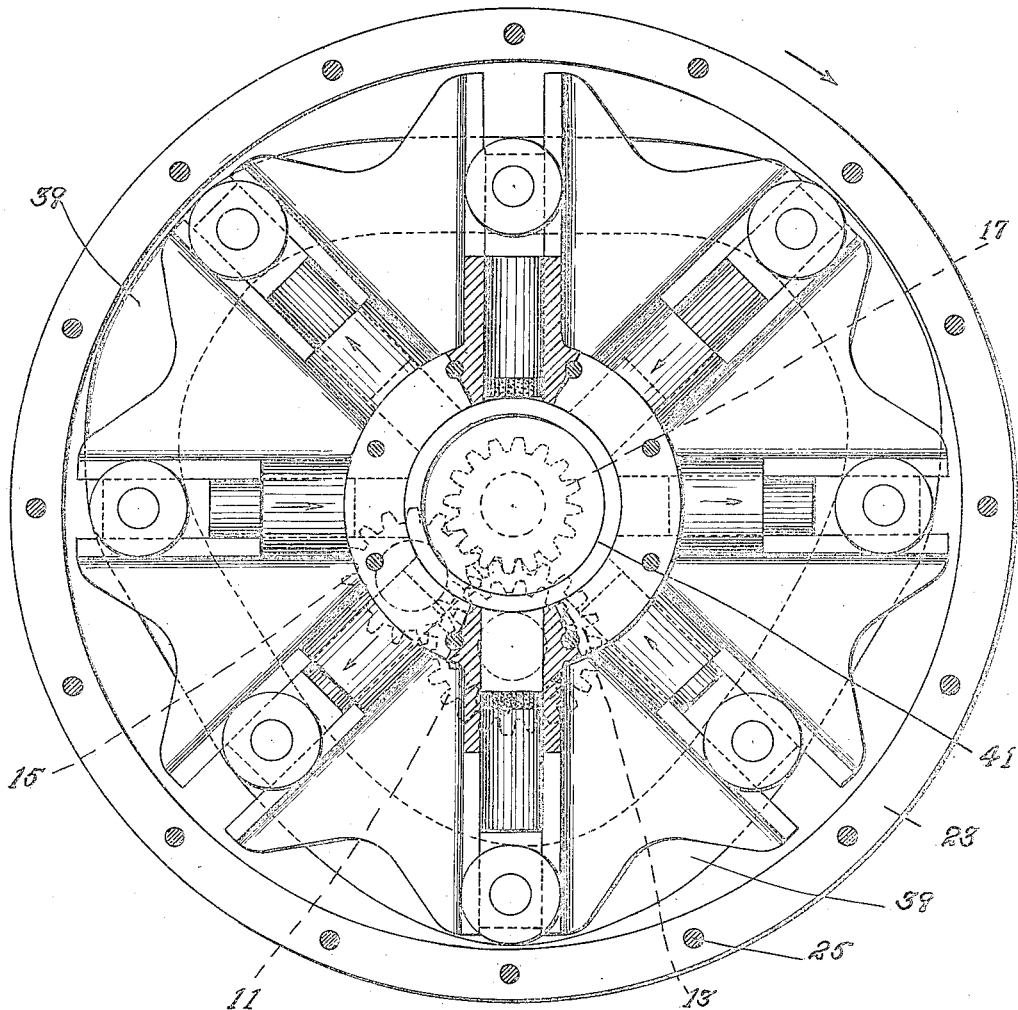

Figure 1 is a vertical section of a transmission mechanism in which the present invention is embodied, and Fig. 2 is a vertical section through the pistons and cylinders in a plane at right angles to that of Fig. 1.

The drawing shows the invention embodied in the transmission mechanism of an automobile, the driving shaft being indicated at 1, the intermediate shaft at 3, and the driven shaft at 5. The intermediate shaft is connected by a sliding clutch collar 7 with the driven shaft, and the usual gears 9, 11, 13, 15 and 17 are provided for reversing the direction of rotation of said driven shaft, the construction and arrangement being such that when the lever 19 is pulled to the left as viewed in Fig. 1, the lever 21 is swung in a clockwise direction thereby moving the collar 7 to the left to free the intermediate shaft 3 from the driven shaft 5 and at the same time moving to the left the gears 11, 13 and 15 so as to bring the gears 9 and 11 and the gears 15 and 17 into mesh. This mechanism will not be described further, since any suitable type of reversing mechanism may be used and the details of construction of the present one form no part of the present invention.

To the engine or driving shaft 1 is fastened a two-part casing 23 held together by bolts 25 and having a bearing upon the intermediate shaft 3. Said intermediate shaft 3 is hollow and has formed upon its end a reservoir 27 for oil or other fluid. This reservoir is closed at its forward end by a plate 127 having in its center a passage 29 controlled by a spring-pressed check valve 31 which is arranged to prevent escape of fluid from the reservoir 27 but to permit fluid to be sucked into said reservoir if at any time said reservoir is not completely full. The passage 29 communicates with two bores 33 which in turn communicate with the interior of the casing 23. This casing contains more or less fluid, and a certain amount of this fluid will collect and remain in the bores 33 in position to be sucked into the reservoir 27 if necessary.

The reservoir 27 has formed in it a plurality of cylinders 227 arranged in a circular pattern and spaced apart forty-five degrees. Pistons 35 in said cylinders have stems upon which are mounted rollers 37; and these rollers run in a double cam-track 39 formed in the two parts of the casing 23, this track being a regular three-point track as shown in Fig. 2.

In order to control the communication between the open inner ends of the cylinders 227 and the reservoir 27, a cylindrical valve 41 is provided having a stem 141 which is slidable in the hollow shaft 3. A collar 43, slidable on the shaft 3, but connected with said stem by a pin 79 which passes through slots 77 in said shaft, is lightly held in the position shown by a spring-pressed ball 45 which engages a shallow socket in the periphery of said shaft, but may be moved to the left when desired to open communication in any desired degree between the cylinders and the reservoir 27. A second shallow socket 80 is provided to hold the valve in its extreme left-hand position. The pin 79 passes through a hole in the stem 141 of the valve. An arm 47 having loose connection with a groove in the collar 43 is fast at its lower end to a rock-shaft 49, and to this rock-shaft are also fast two arms 51 and 53. The arm 51 is connected by a link 55 with a foot lever 57 which is pivoted at 59 about the same axis as is the reverse lever 21. In the position shown the foot lever has been pushed completely down so as to move the cylindrical valve 41 to its extreme right hand position. The arm 53 fast at one end to the rock-shaft 49 is connected at the other end by a link 61 with a foot lever 63 which is herein shown in its raised position, having been elevated to that position by the depression of the foot lever 57. This lever 63 is also connected with the brake rod 65 so that when said lever is pushed down to withdraw the valve 41 the brakes are applied. To this end the lever 63, which is also pivoted at 59, has an arm 163 which is connected through a spring 67 with an arm 69 pivoted at one end about the axis 59 and at the other end to a rod 71 having a bore of large diameter throughout its greater extent and of reduced diameter at its left-hand end. In the larger bore the head 165 slides until it is engaged by the shoulder formed by the reduced portion of the bore.

With the parts in the position shown the pistons are locked, and the driving shaft and driven shaft are rotating at the same rate. If now it is desired to cut off the power from the driven shaft, the foot lever 63 is pushed down and through the link 61, arm 53, rock-shaft 49, arm 47 and collar 43 moves the valve 41 to the left until the ball 45 enters the left-hand socket 80. During the latter part of this movement the shoulder formed by the bore of reduced diameter in the rod 71 has engaged the brake rod and pulled it forward yieldingly through the spring 67. If thereafter it is desired to apply power to the driven shaft, the foot-lever 57 is again depressed whereupon the parts once more assume the position shown.

Referring now more particularly to Fig. 2, in the position of parts there shown, which is the most disadvantageous one possible, the two vertically disposed pistons are at their dead points; and of the other six pistons three are moving toward the reservoir and are therefore "positive", and three are moving away from the reservoir and are therefore "negative". It is, of course, the three "positive" pistons through which the power is being transmitted. It is possible by increasing the number of pistons to multiply this effect, but the essential feature is that in every position of the parts at least three of the "positive" pistons are located in a triangular pattern so that lost motion is never possible and the transmission of power is smooth and free from unevenness. The cam used is a regular one by which is meant that the curves are either simple harmonic or gravity and that the curved sections are arranged symmetrically about the center. The word "regular", therefore, as used in the appended claims, is to be understood to describe a cam of this type.

Having thus described our invention, what we claim as new and desire to secure by Letters Patent of the United States is:

1. A variable speed transmission mechanism comprising a driving member, a driven member, a cam carried by one member, a reservoir and a plurality of opposed pairs of cylinders in communication with said reservoir carried by the other member, pistons in said cylinders, connections between said pistons and said cam such that rotation of said driving member causes reciprocation of said pistons, and means for controlling the communication between said cylinders and said reservoir, the contour of the cam being such that for all positions of the pistons the distance between the opposed ends of the pistons of the several pairs is constant.

2. A variable speed transmission mechanism comprising a driving member, a driven member, a regular three-point cam carried by one member, a reservoir and at least eight cylinders in communication with said reservoir carried by the other member, pistons in said cylinders, connections between said pistons and said cam such that rotation of said driving member causes reciprocation of said pistons, and means for controlling the communication between said cylinders and said reservoir.

3. A driving member, a driven member, a fluid-controlled connection between them comprising a slidable valve, a lever for moving the valve in one direction, a second lever for moving the valve in the opposite direction and connections between said levers and valve such that when one lever is depressed to move the valve in one direction the other lever is raised, and when said last-named lever is depressed said first-named lever is raised.

4. A variable speed transmission mechanism comprising a driving member having a regular three-point closed cam, a driven member having formed thereon a reservoir and at least four pairs of opposed cylinders extending the same distance from the center of rotation and spaced apart substantially the same distance angularly about said center, said cylinders being in communication with said reservoir, pistons in said cylinders, rolls running on said cam and connected to said pistons, and means for controlling the communication between said cylinders and said reservoir, the contour of the cam being such that for all positions of the pistons the distance between the opposed ends of the pistons of the several pairs is constant.

In testimony whereof we have signed our names to this specification.

ROBERT H. LAWSON.
ALBERT E. ROBINSON.